(12) United States Patent
Konopacki (10) Patent No.: US 11,141,775 B2
(45) Date of Patent: Oct. 12, 2021

(54) SYSTEM, METHOD AND APPARATUS FOR MANUFACTURING BOILER TUBES

(71) Applicant: GENERAL ELECTRIC TECHNOLOGY GMBH, Baden (CH)

(72) Inventor: Ronald Francis Konopacki, Windsor, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/345,953

(22) PCT Filed: Sep. 15, 2017

(86) PCT No.: PCT/US2017/051721
§ 371 (c)(1),
(2) Date: Apr. 29, 2019

(87) PCT Pub. No.: WO2018/080655
PCT Pub. Date: May 3, 2018

(65) Prior Publication Data
US 2020/0055109 A1 Feb. 20, 2020

Related U.S. Application Data

(63) Continuation of application No. 15/335,867, filed on Oct. 27, 2016, now abandoned.

(51) Int. Cl.
*B21D 53/06* (2006.01)
*B08B 9/02* (2006.01)
(Continued)

(52) U.S. Cl.
CPC ............ *B21D 53/06* (2013.01); *B08B 7/0042* (2013.01); *B08B 9/021* (2013.01); *B23K 9/235* (2013.01);
(Continued)

(58) Field of Classification Search
CPC ....... F28G 13/00; B08B 9/021; B08B 7/0042; B21D 53/06; B23K 9/235; B23K 26/361; B23K 26/352; B23K 2101/06; B23P 15/26
See application file for complete search history.

(56) References Cited

U.S. PATENT DOCUMENTS

| | | | |
|---|---|---|---|
| 2,649,527 A | 8/1953 | Chapman et al. | |
| 4,434,348 A | * | 2/1984 | Reid ...................... B08B 9/021 219/61 |

(Continued)

FOREIGN PATENT DOCUMENTS

| | | | |
|---|---|---|---|
| CN | 2079181 U | * | 6/1991 |
| CN | 2079181 U | | 6/1991 |

(Continued)

OTHER PUBLICATIONS

General Electric Company; International Patent Application No. PCT/US2017/051721; International Search Report; dated Jan. 25, 2018; (2 pages).

(Continued)

*Primary Examiner* — Bayan Salone
(74) *Attorney, Agent, or Firm* — Grogan, Tuccillo & Vanderleeden, LLP (57) ABSTRACT

A method for manufacturing boiler tubes includes the steps of removing end caps from a plurality of tubes, the plurality of tubes including at least a first tube and a second tube, cleaning an outer surface of the first tube and the second tube, forming a weld preparation on an upstream end of the first tube, forming a weld preparation on a downstream end of the second tube, welding the upstream end of the first tube to the downstream end of the second tube to form a butt weld, to produce a long tube, and with an automated device, measuring a parameter of at least the first tube and the second tube. The steps of removing the end caps, cleaning (Continued)

the outer surface of the tubes, forming the weld preparations, welding the first tube to the second tube, and measuring the parameter are performed autonomously.

20 Claims, 9 Drawing Sheets (51) Int. Cl.
    *B08B 7/00*     (2006.01)
    *B23K 26/36*     (2014.01)
    *B23K 26/352*     (2014.01)
    *B23P 15/26*     (2006.01)
    *F28G 13/00*     (2006.01)
    *B23K 9/235*     (2006.01)
    *B23K 26/361*     (2014.01)
    *B23K 101/06*     (2006.01)

(52) U.S. Cl.
    CPC .......... *B23K 26/352* (2015.10); *B23K 26/361* (2015.10); *B23P 15/26* (2013.01); *F28G 13/00* (2013.01); *B23K 2101/06* (2018.08)

(56) References Cited

U.S. PATENT DOCUMENTS

| | | | | |
|---|---|---|---|---|
| 5,662,145 | A | 9/1997 | Stagg | |
| 6,693,255 | B2* | 2/2004 | Freiwald | B08B 7/0042 |
| | | | | 219/121.68 |
| 9,221,127 | B2* | 12/2015 | Knoop | B21C 51/00 |
| 10,336,482 | B2* | 7/2019 | Konopacki | B65B 3/14 |
| 10,354,371 | B2* | 7/2019 | Konopacki | G06T 7/0004 |
| 10,702,941 | B2* | 7/2020 | Schmidt | B23K 9/127 |
| 2002/0134770 | A1* | 9/2002 | Freiwald | B23K 26/032 |
| | | | | 219/121.68 |
| 2003/0155671 | A1* | 8/2003 | Schmidgall | B28B 17/00 |
| | | | | 264/40.1 |
| 2005/0035094 | A1* | 2/2005 | Titze | B21C 37/126 |
| | | | | 219/121.64 |
| 2005/0224474 | A1* | 10/2005 | Kilburn | B23K 26/142 |
| | | | | 219/121.68 |
| 2013/0048619 | A1* | 2/2013 | Doyle | B23K 9/1735 |
| | | | | 219/122 |
| 2015/0048146 | A1* | 2/2015 | Knoop | B21C 37/08 |
| | | | | 228/102 |
| 2018/0010457 | A1 | 1/2018 | Chabane et al. | |
| 2018/0101943 | A1* | 4/2018 | Konopacki | G06T 7/60 |
| 2018/0111708 | A1* | 4/2018 | Konopacki | B65B 53/066 |
| 2018/0112936 | A1 | 4/2018 | Konopacki et al. | |
| 2018/0243850 | A1* | 8/2018 | Schmidt | B23K 9/10 |

FOREIGN PATENT DOCUMENTS

| | | | |
|---|---|---|---|
| CN | 202114470 U | * | 1/2012 |
| CN | 202114470 U | | 1/2012 |
| EP | 0084455 A2 | | 7/1983 |
| EP | 00084455 B1 | | 9/1986 |
| GB | 1525876 A | | 9/1978 |
| JP | S53069812 U | | 6/1978 |
| JP | S53084833 A | | 7/1978 |
| JP | S56051225 B2 | | 12/1981 |
| JP | S61095730 A | | 5/1986 |
| JP | H06300210 A | | 10/1994 |
| JP | H08112683 A | | 5/1996 |
| JP | 2006523538 A | | 10/2006 |
| JP | 2008200736 A | | 9/2008 |
| JP | S50019279 B2 | | 9/2012 |

OTHER PUBLICATIONS

Corresponding Japanese Patent Application No. 2019-520006 Office Action dated Jun. 11, 2011 with English translation.

* cited by examiner

SYSTEM, METHOD AND APPARATUS FOR MANUFACTURING BOILER TUBES

This application is a National Stage Patent Application of PCT/US2017/051721, filed on Sep. 15, 2017, which claims the benefit of priority to U.S. patent application Ser. No. 15/335,867, filed on Oct. 27, 2016, the disclosures of all of which are incorporated by reference herein in their entireties.

BACKGROUND

Technical Field

Embodiments of the invention relate generally to power generation systems and processes and, more particularly, to a system method and apparatus for producing long tubes for boilers.

Discussion of Art

Long tubes for use in boilers are typically manufactured by welding commercially available, shippable tube lengths end to end. These long tubes vary in length depending on production and machine capability requirements. Typically, tube length is limited by the physical limitations of tube bending systems, which are utilized to bend the long tubes into serpentines. In general, existing long tube bending systems can handle tubes in the 25 to 100 meter length range. To meet long tube end requirements, multiples of long tubes are made to the maximum capacity of the bending system in sections and are butt welded together to produce the desired finished product length. In addition to having a variable length, the long tubes, which consist of multiple individual tubes, can have multiples of tube diameters, wall thicknesses and chemical compositions.

All tubing used to manufacture long tubes for use in boilers undergoes the same preparation process prior to bending. These steps are sequential and generally manual in operation, and/or are carried out on dedicated machines that each perform one of a plurality of discrete operations. Moreover, such steps are typically run in batch mode, with material storage between operations which contributes to high cost due to increased work in progress (WIP) and the number of people to operation each machine. For example, existing long tube manufacturing processes involve pre-preparation, material checking, cleaning, tube end preparation, straight tube butt welding, non-destructive weld testing, repair, and post-production bending steps, all of which are carried out on individual machines requiring manual operators.

In the pre-preparation step, bundled tubes are unloaded from a truck at the factory by indoor or outdoor cranes and inspected to ensure that they meet the stipulations of the purchase order in terms of dimensions, quantity and chemistry. The individual tubes are physically marked at the tube mill with chemistry grade, dimensions such as outside diameter and wall thickness, and heat number for traceability, and stored in piles in an outdoor storage yard until required for production. Prior to further processing, the tubes are transported to a shot blasting area to clean the tube surface.

In most production facilities material checking is performed manually by the quality inspector or the shot blast operator at the tie the tube bundles are received at the work station. The tubes are manually checked against the production schedule to determine that the proper tubes are at the work station. Any material checks are made on a random basis, as such checks are not typically a production requirement.

Before beginning any manufacturing operations such as welding and eventual painting, the cleaning step is used to clean the surface of the tube to remove any mill scale, oxidation, oils or preservative coatings. To accomplish this, the tube bundles are broken and the individual tubs are fed through a commercial shot blasting system which utilizes steel shot to clean the surface. The shot blasting systems are normally batch loaded and can process from one to four tubes at a time. In current processes, the protective tube end caps installed at the mill remain in place on the ends of the tubes to prevent the blast media from entering into the interior of the tub. These caps are then manually removed using pliers or a screwdriver after blasting or just before the next operation. After cleaning, the tubes are remarked by hand to meet traceability requirements and then collected in storage racks where they are bundled and queued for temporary storage before moving to the next operation.

In most production facilities, for tube end preparation, the tube bundles are either sent to an independent preparation station for machining weld preparations on the ends of the tubes so that they may be welded, or to a smaller line which saws and cuts the tubing into shorter lengths for use as header nipples or loose tubes. These end preparation lines can be manual or semiautomatic standalone systems. During end preparation, the outside diameter of the tube ends are cleaned and then a weld groove preparation machined into the ends. Because there are a variety of tube butt weld preparation geometries, however, different tooling for varying tube diameters and wall thicknesses is required. Tool change for these and tool wear reasons can be very time consuming. After completion of the machining of weld preparations on the tube ends, the tubes are sent to storage racks or rebundled for the next operation.

In most factories, the various work stations are not all directly connected by conveyor, which requires tube bundles to be lifted by crane from one station to another. In order to butt weld tubes together to form long tubes, tube bundles are placed on an unbundling rack where the bundling straps are removed and they are fed into storage/feed racks to queue prior to welding. The individual tubes are loaded onto an infeed conveyor on demand where they are shuttled to the straight tube welding work station. At this station, the tubes are serially welded end to end using manual butt welding, orbital welding and the like. With existing systems, insertion of the tubes, alignment, start/stop and weld parameter control are all performed manually by an operator.

Subsequent to completion of the welds non-destruction examination of the weld is performed such as through the use of x-rays. Typically, this is a standalone work station. Tubes that pass inspection are stored in queue for bending, while tubes that do not pass are repaired. With existing systems, repair involves marking the defect location, passing the tube through the system unrepaired, and offloading the tube to a repair area for repair. Once the welds are completed, the long tube is placed into a feed rack system for bending.

As indicated above, existing manufacturing processes use individual, discrete machines and manual operators, and often require the tubes to be queued prior to each step, resulting in significant manufacturing time and costs.

In view of the above, there is a need for a system, method and apparatus for manufacturing long tubes for boilers that is more streamlined, cost-effective and less time consuming than existing methods.

BRIEF DESCRIPTION

In an embodiment, a method for manufacturing boiler tubes is provided. The method includes the steps of removing end caps from a plurality of tubes, the plurality of tubes including at least a first tube and a second tube, cleaning an outer surface of the first tube and the second tube, forming a weld preparation on an upstream end of the first tube, forming a weld preparation on a downstream end of the second tube, welding the upstream end of the first tube to the downstream end of the second tube to form a butt weld, to produce a long tube, and with an automated device, measuring a parameter of at least the first tube and the second tube. The steps of removing the end caps, cleaning the outer surface of the tubes, forming the weld preparations, welding the first tube to the second tube, and measuring the parameter are performed autonomously.

In another embodiment, an autonomous apparatus for the manufacture of long boiler tubes is provided. The apparatus includes a decapping station configured to remove end caps from ends of a first tube and a second tube, a cleaning station configured to remove a contaminant surface layer from an outer surface of the first tube and the second tube, a weld preparation station configured to form a weld preparation in at least an upstream end of the first tube and a downstream end of the second tube, a joining station configured to butt weld the first tube to the second tube, and at least one control unit configured to control operation of the decapping station, cleaning station, weld preparation station and joining station without intervention by a human operator after the first tube and second tube are received at the decapping station, and to control material flow of the first tube and the second tube from the decapping station to the joining station.

In yet another embodiment, an autonomous system for the manufacture of long boiler tubes is provided. The system includes a decapping device configured to remove end caps from ends of a first tube and a second tube, a cleaning device in line with the decapping device and being configured to remove a contaminant surface layer from an outer surface of the first tube and the second tube via laser ablation, a weld preparation device configured to machine a weld preparation in at least an upstream end of the first tube and a downstream end of the second tube after the contaminant surface layer is removed, a joining device configured to weld the first tube to the second tube, and at least one control unit configured to automatically control operation of the decapping device, cleaning device, weld preparation device and joining device, and to control material flow of the first tube and the second tube from the decapping device to the joining device to produce a long boiler tube.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with the manufacture of long tubes for boilers, including for use in serpentine elements such as superheaters, reheaters, economizers and waterwall membrane panels, embodiments of the invention may also be utilized for creating long lengths of any material or stock, for a variety of end uses. For example, the system and method of the invention is applicable to creating long lengths of tubing or conduit for a variety of applications.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer.

Embodiments of the invention relate to a system, method and apparatus for manufacturing long boiler tubes. The system is operable in a fully autonomous mode and delivers clean, verified and end-prepared long tubes for further processing to a serpentine bender or other tube fabrication process. Raw tubes shipped from a tube mill are debundled and fed into the system of the invention and emerge as a finished long tube which meets production requirements to be bent into a defined element or long waterwall panel. As used herein, "autonomously" means without manual or human intervention and without substantial downtime between successive steps or operations. In addition, autonomously includes performing the operations without storing tubes offline (i.e., outside of the system) between successive steps or operations.

Figure 1:
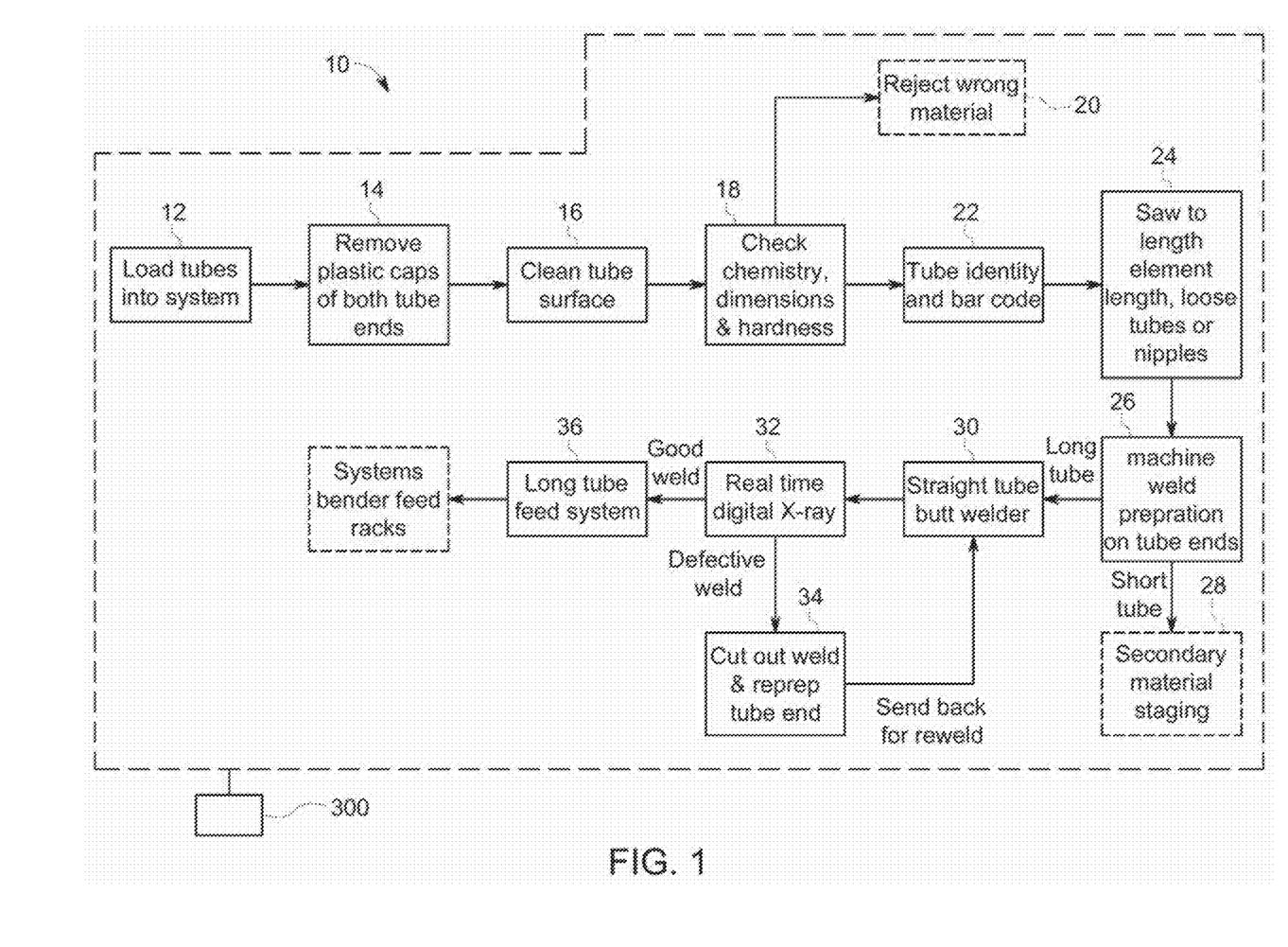
FIG. 1 is a schematic illustration of an automated system for manufacturing long boiler tubes, according to an embodiment of the invention.

Referring to FIG. 1, a system 10 in the form of a fully automated and integrated apparatus for manufacturing long tubes for a boiler is illustrated. As shown therein, the system 10 includes a plurality of subsystems, stations and devices each performing one or more discrete functions. The system 10 includes an inlet conveyor 12, a decapping device 14, a tube cleaning system 16, a verification inspection system 18, an offload device 20, an identification station 22, a cutting station 24, an end preparation system 26, a short tube offload device 28, a butt welding system 30, a weld testing station 32, a repair system 34, and an exit conveyor 36. As discussed in detail hereinafter, the system 10 allows for the manufacture of long boiler tubes without any queue steps between operations.

Figure 2:
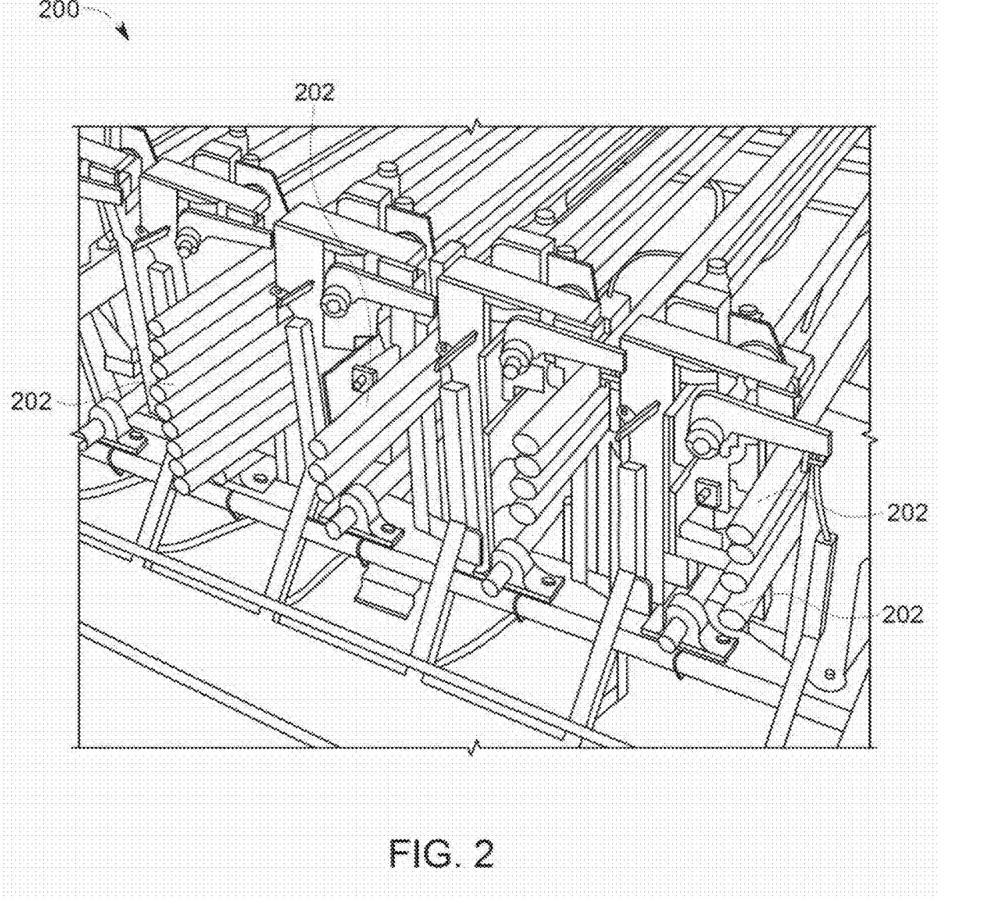
FIG. 2 is a perspective view of a storage rack from which tubing is conveyed to the system of FIG. 1.
Figure 10:
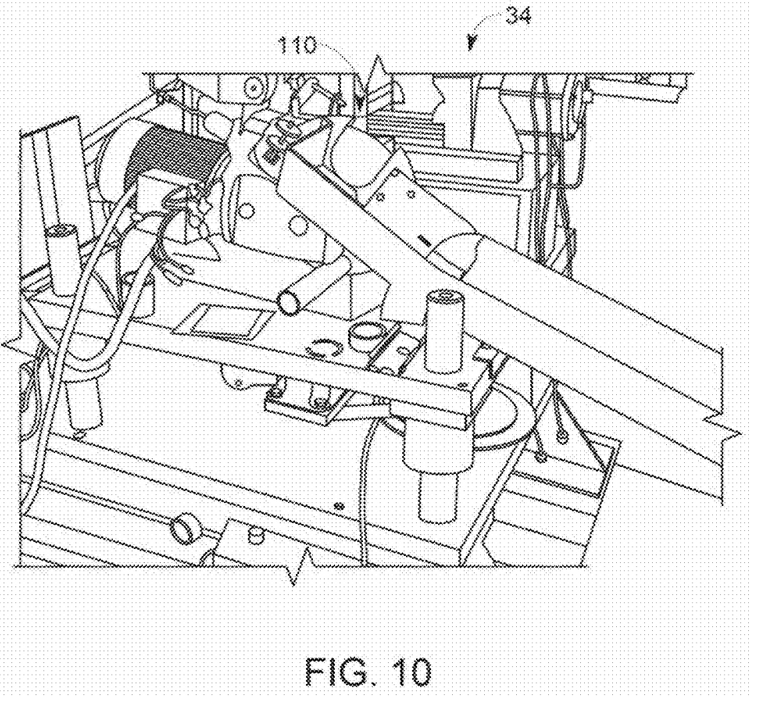
FIG. 10 is a perspective view of a cutting station of a repair system, forming a part of the system of FIG. 1.
Figure 11:
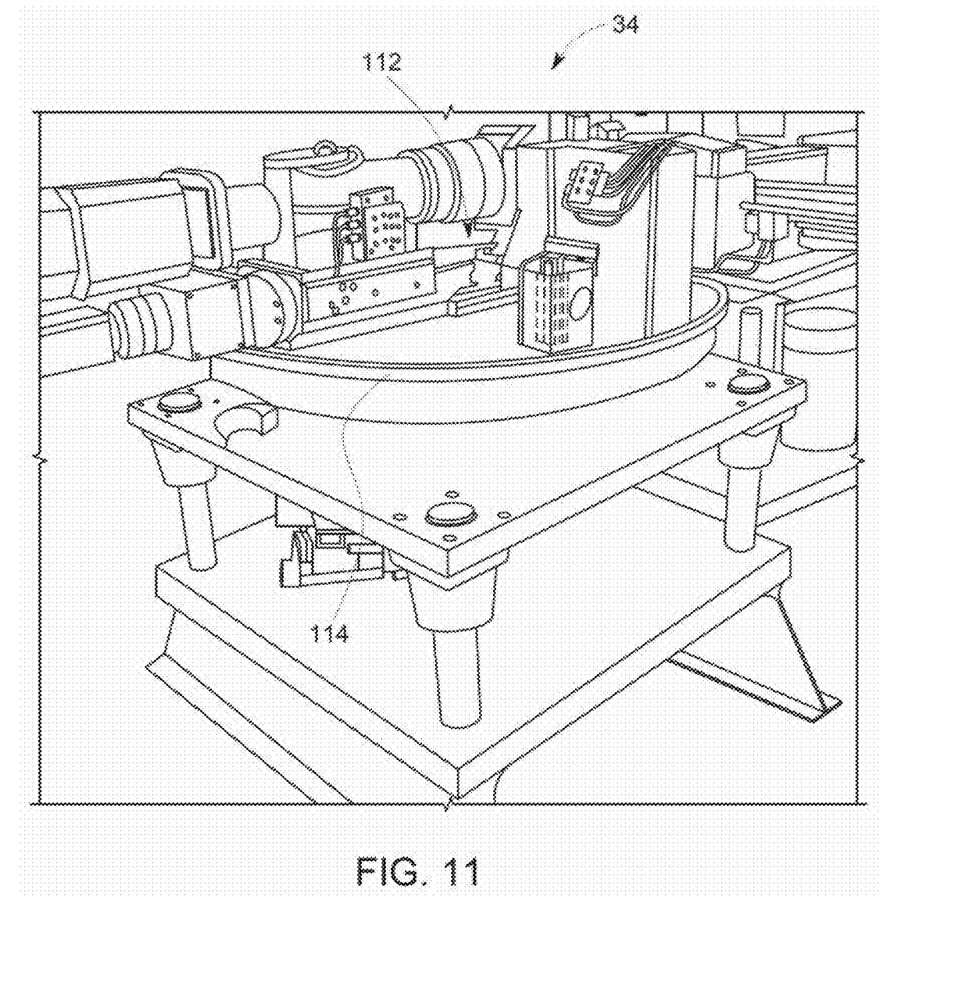
FIG. 11 is a perspective view of a tube end preparation station of the repair system, forming a part of the system of FIG. 1.
Figure 12:
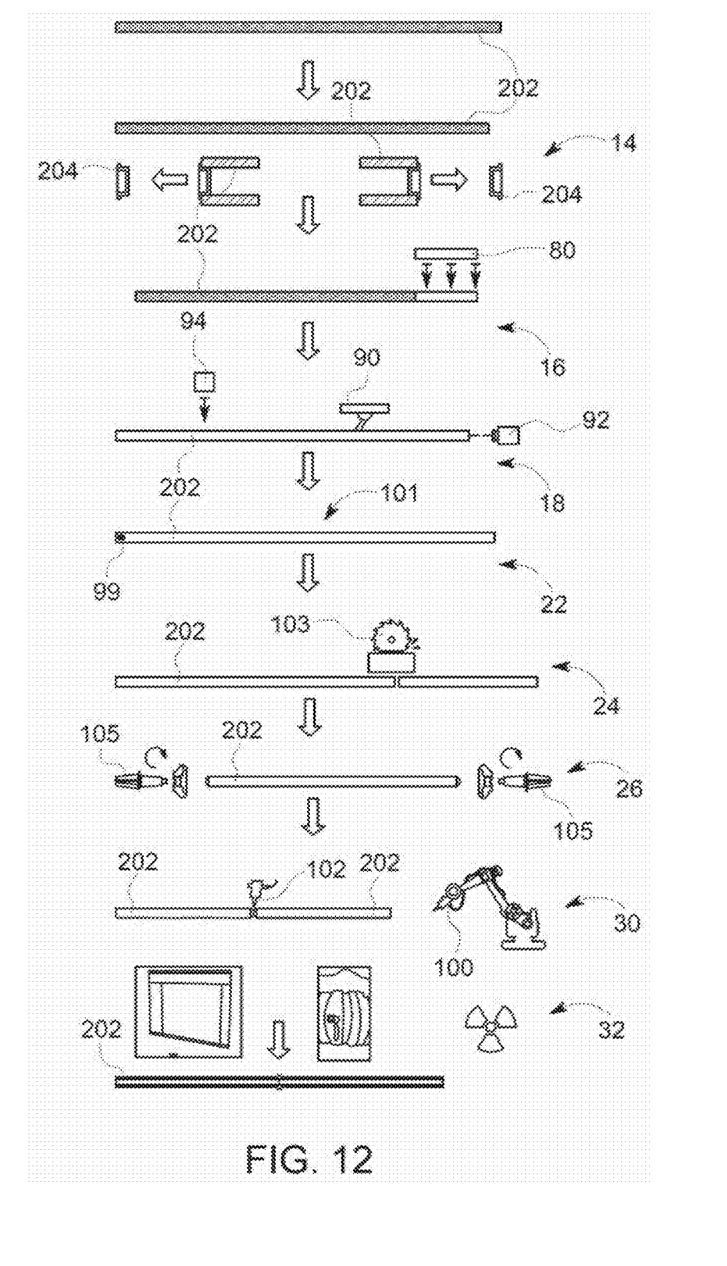
FIG. 12 is a process flow diagram of the system of FIG. 1.

With reference to FIGS. 2-11, and as perhaps best illustrated in FIG. 12, the configuration and operation of each of the respective subsystems and stations is shown. In an embodiment, the tubes are loaded into the system 10 by inlet conveyor 12 from an automated tube storage system or transport system. In other embodiments, the tubes may be delivered to the system 10 and introduced manually by a feed rack. FIG. 2 shows an exemplary feed rack storage system 200 storing a plurality of tubes 202 to be welded to produce a long tube. The tubes 202 are unbundled and stored in the order in which they will be welded end to end.

Figure 3:
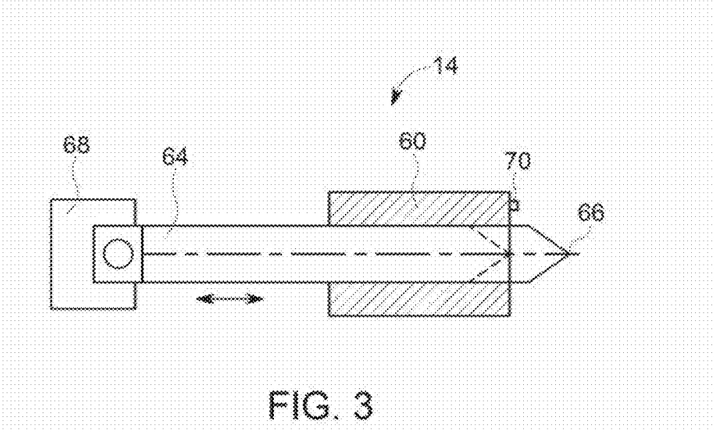
FIG. 3 is a cross-sectional view of a decapping device of the system of FIG. 1.
Figure 4:
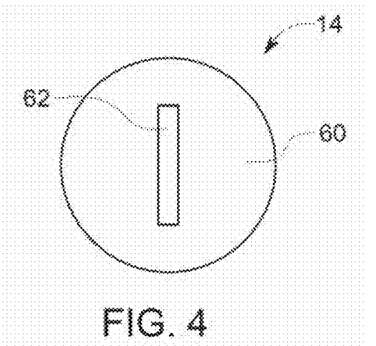
FIG. 4 is an end, elevational view of the decapping device of FIG. 3.
Figure 5:
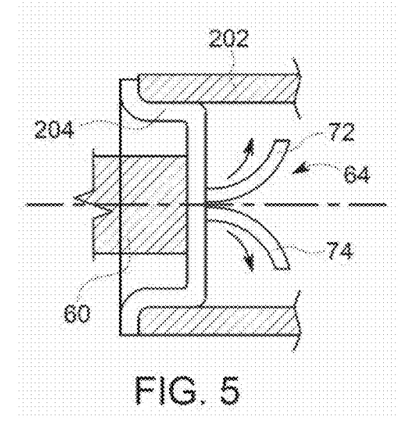
FIG. 5 is a detail, cross-sectional view of a decapping operation of the system of FIG. 1.

Once loaded into the system either manually or via the inlet conveyor 12, the tubes are passed to the automated decapping device 14 which removes the plastic end caps from the tubes. It is contemplated that the decapping device 14 may be located before or after the storage racks and, in any event, before the cleaning system 16. The decapping device 14 is located in line with the inlet conveyor 12 and may be of a fixed or elevated design. With reference to FIGS. 3-5, the decapping device 14 may comprise a centering device or anvil 60 having a generally rectangular slot 62 therethrough, within which a bisected blade 64 having a piercing end 66 is slidably received. The blade 64 is connected to an actuator device 68 configured to move the blade 64 axially within the slot 62. In an embodiment, the actuator device may be a spring, pneumatic, hydraulic, electrical or other device configured to extend and retract the blade 64 from the anvil 60, as illustrated by the dashed and solid lines in FIG. 3. In an embodiment, the anvil may be approximately 1.5 inches in length, and the angled ends of the blade 64 may be approximately ¼ inches long.

As best shown in FIG. 5, in operation, the centering device/anvil 60 is utilized to first locate the center of the plastic caps 204 on the tube ends. The actuator device 68 is then activated to extend the blade 64 from the slot 62 within the centering device 60, until it pierces the cap 204. In an embodiment, the decapping device 14 may include a mechanical trigger or sensor 70 electrically connected to the actuator device 68 such that actuator device 68 automatically extends the blade 64 is from the centering device 60 to pierce the cap 204 when the centering device 60 contacts the end cap 204. As shown in FIG. 5, the bisected blade 64 includes two, flat blade portions 72, 74 that are formed (such as mechanically deformed or tempered) such that they are biased away from one another when not restrained by the walls of the slot 62. In this manner, when the blade 64 is extended from the slot 64, the blade portions 72, 74 will bend in opposite directions. The plastic tube cap 214 can then be pulled from the tube 202 gripped between the extended blade 64 and anvil 60. The blade 64 may then be retracted within the slot 62 using the actuator device 68 (such as by releasing tension), causing the cap to drop off.

Figure 6:
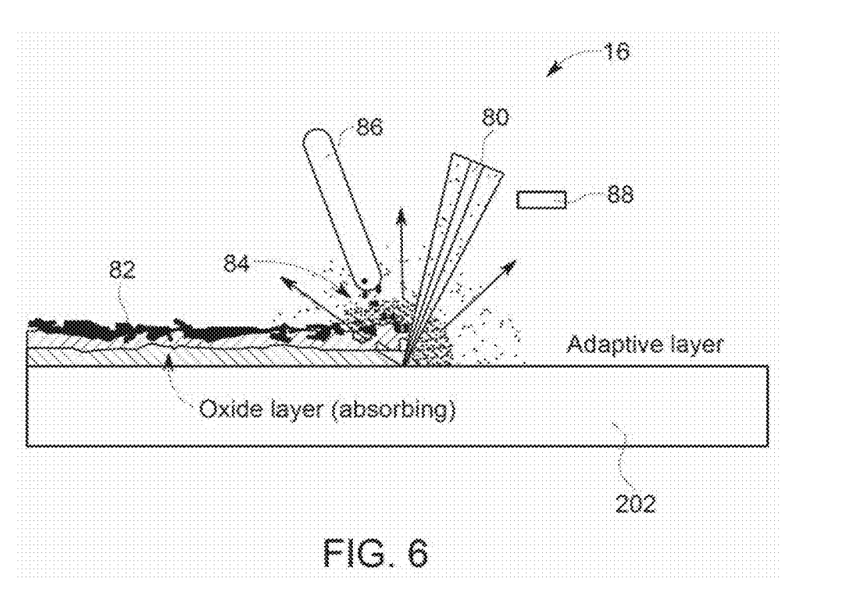
FIG. 6 is a schematic illustration of a laser ablation cleaning system and operation of the system of FIG. 1.

Turning now to FIG. 6, once the ends caps are removed from the tubes, the tube cleaning system 16 is utilized to remove a contaminant surface layer 82 from the tubes 204 via laser ablation. As shown therein, the system 16 directs a laser beam 80 against the surface of the tube 204 where most of the laser energy is absorbed by the contaminant layer 82. The layer 82 is transformed into plasma 84, which causes shock waves that crack and decompose the layer 82. The ablated contaminants (vaporized fumes and ash particles) are removed from the tube surface such as via a suction device 86 having an integrated filter. The tube material, unlike the surface contaminants (i.e., contaminant layer 82), does not absorb, but rather reflects laser beam energy. In an embodiment, the cleaning system 16 may include a sensor 88 configured to detect this laser beam energy that is reflected from the tube surface. Accordingly, once the reflective substrate layer has been reached, as detected by the sensor 88, a control unit is configured to automatically stop the laser cleaning process.

By automatically stopping the cleaning process as soon as the tube surface has been exposed, mechanical and/or thermal damage to the tube surface may be prevented or minimized. In contrast to existing cleaning devices, the automated cleaning system 16 of the apparatus 10 is compact, provides a cleaner surface, and does not produce large volumes of waste that must be disposed. In addition, the blasting medium does not degrade and does not need to be replaced (which is the case where metal shot or blasting grit is utilized). Moreover, the system 16 obviates the need to keep the protective end caps on the tubes while cleaning, which is typically required to keep shot out of the tubes during typical shot blasting processes.

Figure 7:
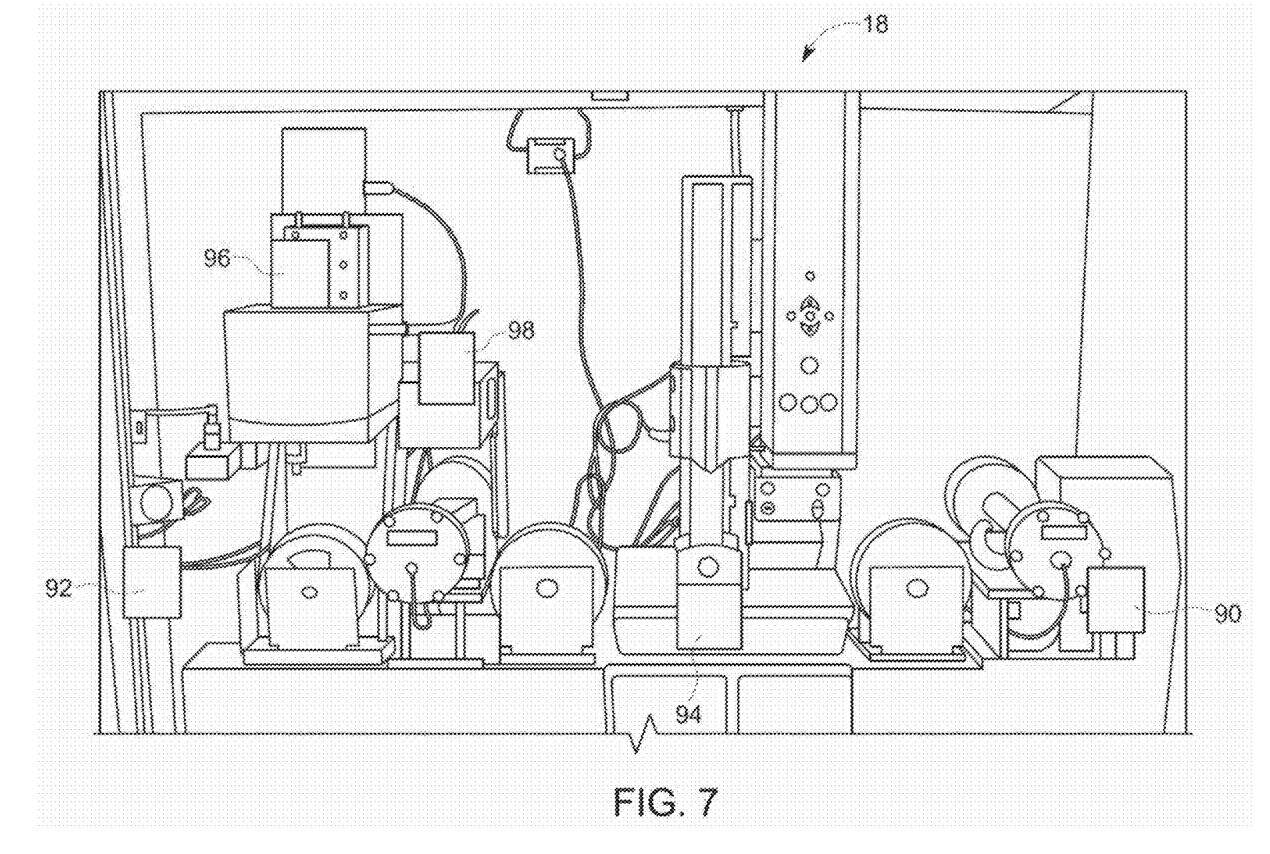
FIG. 7 is a schematic view of a verification inspection system of the system of FIG. 1.

Once cleaned, the tubes are passed axially to the automatic inspection and verification system 18, which performs a two step inspection and verification of the tubing. At this point, the tub surface is clean and does not require special preparation such as sanding to prepare the tube surface for the metal identification operation (which would typically be required after shot blasting). With reference to FIG. 7, the automatic inspection and verification system 18 includes a commercial grade X-ray fluorescence (XRF) unit 90 commonly used in a positive material identification (PMI) or portable alloy analyzer for nondestructive analysis and grade identification of metal alloy materials. The tube stops for a fraction of a second to perform the analysis, and the material information is compared in an on-board computer to that of the production requirement stored in a database to ensure that the correct tubing entered the system 10. The second step which takes place concurrently with the material identification is an optical measurement of the tube outside and wall thickness of the tube, using an optical sensor or camera 92. In an embodiment, the system 18 may also include an automated hardness tester 94, which is used to verify, for example, tempered ferritic alloys which have enhanced creep strength. This information is captured and sent to a quality database.

In addition to the above, in an embodiment, the inspection and verification system 18 may include a dot peen marker 96 that marks the surface of the tube with material specifications and/or parameters such as those verified using the XRF unit 90, optical sensor 92 and hardness tester 94. The system 18 may also include a reader 98 for a bar code and material ID. In yet other embodiments, the system 18 may also include an eddy current inspection device to check wall thickness as the tube passes through the system to ensure that the tube has a uniform wall thickness throughout its length and conforms to a preset standard or requirement. This test would be redundant to that conducted at the tube mill, but would provide additional reassurance that the incoming tube conforms to all contract requirements.

The properties of the tube, as measured by system 18, are checked against the materials which are called for in the production schedule. If they do not meet the requirements, the tube is automatically rejected and off loaded onto a secondary dump rack 20, and the system 18 automatically generates an alert or notification of the non-conformance before any more tubes can be processed and significant work in the form of end preparation and welding can be done. This eliminates the possibility that nonconforming materials can enter the production line where significant additional work is done or the possibility that they can be mistakenly incorporated into finished products.

Figure 8:
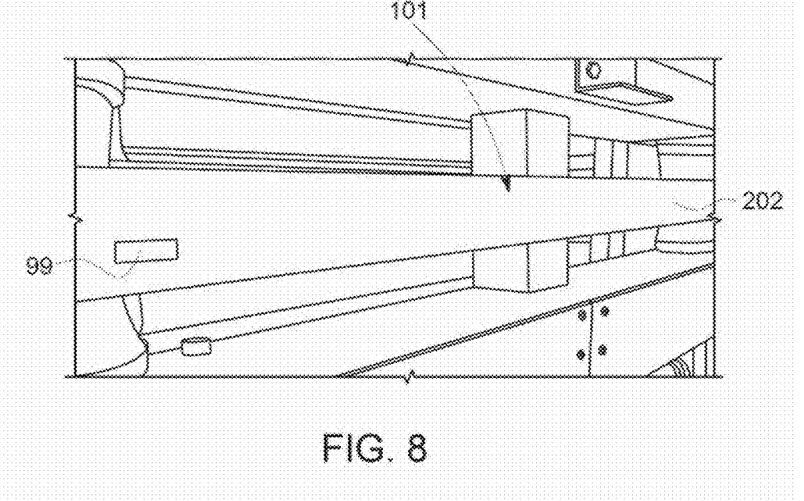
FIG. 8 is a schematic illustration of a section of tubing, showing markings applied by an identification system of the system of FIG. 1.

After successfully passing the verification testing, the identification station 22 applies identifying information to the outside surface of the tube. This identifying information may take the form of a unique serial number along with production information. In an embodiment, the identifying information may be applied to the outside surface of the tube using an inkjet printing system. The printed information includes a bar code 99 with the serial number, as well as human readable information 101 along the length of the tube in a repeating pattern, as shown in FIGS. 8 and 12. The repeating pattern ensures that a record of the tube information is preserved even if a section of tube is cut off or some other process renders a portion of it unreadable. In addition to the unique identification serial number, the bar code may contain vendor information, purchase order number and heat number, and shop order number. This information will be traceable in the manufacturing system and can also be identified by handheld bar code scanners and automated scanners location at various subsequent stations. An example of a tube 204 having printed identifying information is shown in FIG. 8.

After printing the identifying information, the tubes are passed to the cutting station 24 where the tubes are cut to length with a saw 103. In an embodiment, the cutting station 24 includes a measuring device, a clamping device and a saw. The incoming tubes are measured to determine whether the tubes are the proper length or whether trimming is required. If the tube is the proper length, it passes through the cutting station 24 without cutting. If the tube requires cutting, the measuring device measures the tube to the desired length, clamps the tube, and actuates a saw to make the cut. In an embodiment, the saw is a cold saw on a transfer rail. In an embodiment it is contemplated that the cutting station 24 may be utilized to make short nipples or loose tubes, where desired.

With further reference to FIG. 1, after cut to the proper length, the tubes are passed to weld preparation station 28 where a weld preparation is machined on one or both ends of the tube, as called for in its sequence through the system. The weld preparation station 28 includes a standalone machining station with a tool changer which is run under automated control (such as, for example, CNC or PLC control). The station 28 may employ two methods of machining: a spindle 105 with a programmable single point tool or a machining head with multiple inserts. The tube will arrive at the station 28 by a conveyor where it will hit a hard stop to position it at a known distance from the tool. A clamping mechanism will hold the tube in place and the tool will orbit the tube end, thereby machining the desired weld preparation. In an embodiment, the tool is capable of making conventional "Vee" preparations for use in field welds, as well as "J" grooves for automated welding. The station 28 may include two separate substations or work areas (with separate machining heads or tools) by which opposing ends of the tubes may be machined.

In an embodiment, any short tubes may then be offloaded by an offload device 28 and stored in offload feed racks, for later use, while longer tubes for use in manufacturing a long tube may moved to the welding station 30 by a conveyor. This allows the system 10 to be used for nipples and loose tubes which only need to be verified, cut to length and prepped at either end.

At the welding system or station 30, individual tubes are joined end to end by butt welding. In an embodiment, the welding station 30 has two work stations each having a robotic welding arm. In other embodiment, there may only be one work station. The station 30 also includes a bar code reader configured to verify the tube serial numbers as the tubes enter the station 30. The job number, tube diameter, tube wall thickness and type of material obtained by reading the bar code may be utilized by the control unit of the station 30 to determine the welding procedure to be carried out. The control unit is configured to verify the welding procedure to ensure that the proper procedure is being used, and to provide preheat if required.

Figure 9:
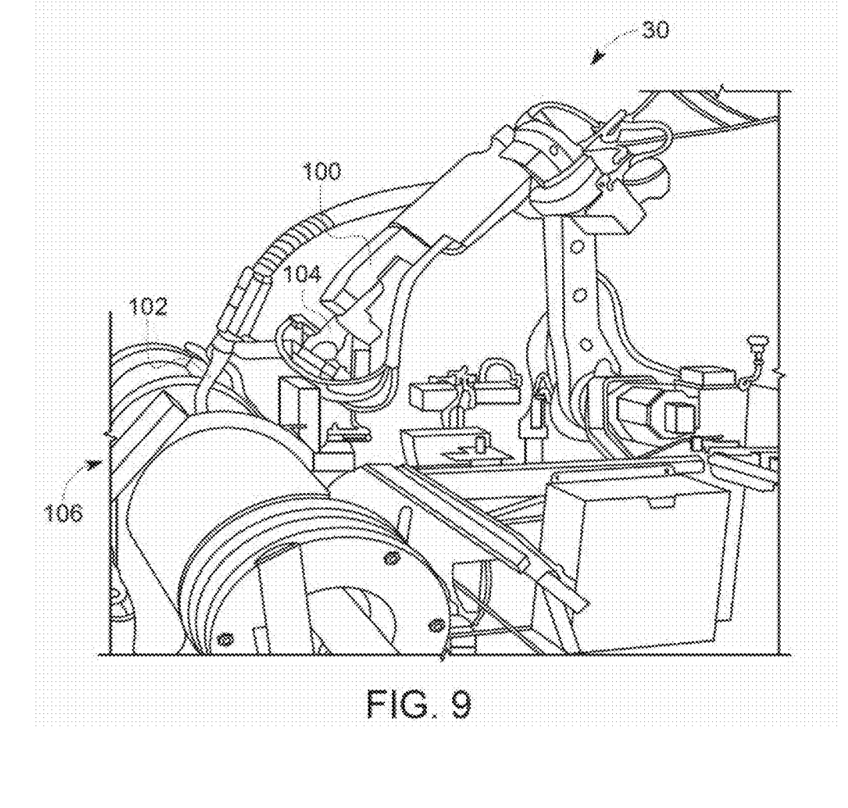
FIG. 9 is a perspective view of a welding system of the system of FIG. 1.

With reference to FIG. 9, the tubes enter the welding station 30 in order of the individual tube subsets that make up the long tube. A tube stop positions the tubes with respect to the welding torch nozzle. The stop retracts and lathe type chucks 106 clamp the tubes to maintain orientation. The trailing edge of the first tube is aligned with the leading edge of the second tube using a sensor. The stop is then retracted and the tube end weld preparations are aligned and read), for welding.

With the robotic welding arms 100, the welding process torch 102 is manipulated in all directions by a robot, under control of the control unit, and alignment of the tube butt joint is measured by a robotic optical or vision system 104. The robot also is used to automatically control oscillation width as the weld deposit fills the weld groove. The weld consumable changeover is done by the robot automatically storing/retrieving torches as required by the tube butt weld materials. The robotic arms operate autonomously to weld the tube butt joints.

As shown in FIG. 1, the welding station 30 and work stations thereof are directly inline connected to the weld testing station 32 to inspect the welds immediately after they are made. At the weld testing station, every weld is inspected using x-rays. The weld testing station 32 is configured to operate autonomously using Automated Defect Recognition (ADR) technology which recognizes and classifies defects. This is a fully computer operated system which, when a defect in a weld is identified, it is measured and rejected if it is determined that it is out of conformance with an accepted standard. This information is recorded by the system such as for statistic measurement purposes and sent into a repair cycle, as discussed hereinafter.

In an embodiment, the weld testing station 32 is a digital, in-line x-ray system with ADR, and includes an enclosure which is radiation proof, an x-ray camera, and a digital image-capturing device. The x-ray camera and digital image capturing device are configured to perform a radiographic inspection of the butt welds, while the ADR imaging software evaluates the radiographic images, all without operation intervention. The software analyzes each of the welds for defects and provides statistical process control data, as indicated above.

In the event that defective welds are identified that do not meet standards, the system 10 is configured to automatically repair the welds after examination. In connection with this, the system 10 includes a repair station 34 intermediate the straight tube welding station 30 and the weld testing station 32. As discussed above, the x-ray taken at station 32 is recorded within the quality database system by defect type for statistical purposes, and the tube is reversed (i.e., moved backwards) to the repair station 34 from the x-ray enclosure. The system, through a sensing or measuring device, positions the defective weld over a saw, such as an elevated cold saw 110, as shown in FIG. 10, and the saw 110 cuts through the center of the butt weld. The saw 110 then retracts and the cut ends of the tube are fed into a CNC machining head 112 on a rotating table 114, as shown in FIG. 11. The rotating table 114 is configured to elevate, clamp the tube, and machine a weld preparation on the cut end of one tube and then rotate 180 degrees to machine a weld preparation on the cut end of the other tube. In embodiments where a two line straight tube welder is used, the repair station would shuttle between two lines.

Following cut out of the defective weld and re-machining new weld preparations on the cut tube ends, the two sections of tubing are sent back to the welding station 30 by reversing the conveyor. The process to complete anew butt weld is repeated and the weld is checked and verified once again by the weld testing station 32.

When all butt welds have been examined and passed, the completed long tube exits the system 10 via the outlet conveyor 36, and is transported directly to a bending system or is stored in a storage system for queue to the bender where the tubes are then selected for bending an ejected from the storage system in the order as required for production.

Referring now to FIG. 12, a process flow diagram illustrating operation of the automated system 10 is shown. As discussed above, the inlet conveyor 12 is utilized to load raw tubes of various diameters, wall thickness and chemistry. The plastic end caps are then removed from the tubes at station 14, and the outside surface of the tubes are cleaned using laser ablation, at station 16. The tubes are axially passed to the verification and inspection station 18, where tube dimensions, chemistry and hardness are measured automatically. Any tubes that are rejected are offloaded from the in-line system. At the identification station 22, tube identification information is applied to the outer surface of the tubes, which includes a bar code and human and/or machine readable text. The tubes are then cut to length at station 24, and passed to the weld preparation station 26 where weld preparations are machined on the tube ends using a spindle and automatic tool changer. Where shorter tubes are not being processed, the tubes with weld preparations are then conveyed to the welding station 30 where the tube sections are butt welded end to end using a robotic welding system. The welds are then inspected for defects using a digital, in-line x-ray system with automated defect recognition, at inspection station 32. A repair station 34 is utilized when a butt weld is rejected. Rejected welds are cut at the centerline of the weld and the tube is re-machined with a new weld preparation and is reversed on the conveyor back to the welding station 30 to be re-welded. Once a long tube is formed comprising tube lengths butt welded to one another, the long tube exists the system 10 by conveyor for storing in queue or immediate bending to a desired shape.

As illustrated in FIG. 1, the system 10 may include a master control unit 300 electrically or otherwise communicatively coupled with each station/subsystem for controlling operation of the various stations and conveyors arranged therebetween. While FIG. 1 illustrates a master control unit 300, it is contemplated that each of the stations, individually, may include a control unit integrated therewith for controlling that station-specific operation as part of the overall manufacturing process. The control unit 300 may include input/output capabilities that allow, for example, process status to be displayed and to allow for tube configurations, production schedules, changes and the like to be input into the system 10 for autonomous execution.

As indicated above, the system, method and apparatus of the invention therefore provide for the fully autonomous manufacture of long boiler tubes. This is accomplished by the in-line arrangement of stations and subsystems that are configured to perform one or more discrete steps in the in-line manufacturing process under control of the control unit 300 (or multiple control units). As used herein, "autonomous" means fully automated, without the need for human intervention between loading of the tubes into the decapping station, and removal of the tubes from the weld testing station, including without the need for human operator analysis of system or sensor measurements, positioning of tubes or operation of the various stations, subsystems and or devices. In addition to obviating the need to employ multiple human operators, the invention provides for improvements in manufacturing efficiency by eliminating queuing of the tubes between stations or operations and by passing the tubes directly from station to station to perform the various required operations.

In an embodiment, a method for manufacturing boiler tubes is provided. The method includes the steps of removing end caps from a plurality of tubes, the plurality of tubes including at least a first tube and a second tube, cleaning an outer surface of the first tube and the second tube, forming a weld preparation on an upstream end of the first tube, forming a weld preparation on a downstream end of the second tube, welding the upstream end of the first tube to the downstream end of the second tube to form a butt weld, to produce a long tube, and with an automated device, measuring a parameter of at least the first tube and the second tube. The steps of removing the end caps, cleaning the outer surface of the tubes, forming the weld preparations, welding the first tube to the second tube, and measuring the parameter are performed autonomously. In an embodiment, the method may also include the step of receiving, via a conveyor, the plurality of tubes for removal of the end caps. In an embodiment, the parameter includes at least one of tube dimensions, wall thickness, hardness and chemistry. In an embodiment, the method may also include the steps of comparing the measured value for the parameter of the first tube to a required value for the parameter stored in memory, and offloading the first tube if the measured value for the parameter does not match the required value. In an embodiment, the method further includes, with an automated printing system, receiving values for the measured parameters of the first tube and the second tube, and printing identifying information on the outer surface of the first tube and the second tube, the identifying information including at least a value for at least one of the measured parameters. In an embodiment, the method may also include the step of, prior to forming the weld preparation on the first tube and the second tube, cutting at least one of the first tube and the second tube to a predetermined length. In an embodiment, the method may also include the step of after welding the first tube to the second tube, inspecting the butt weld for defects utilizing a digital, in-line x-ray system with automated defect recognition. In an embodiment each of the steps is performed autonomously, as an inline part of a long tube manufacturing process, without intervention by a human operator. In an embodiment, the step of removing the end caps includes, for each end cap, bringing a centering device into engagement with the end cap, extending a bisected blade from the centering device such that the bisected blade pierces the end cap and opposed blade portions of the blade bias away from one another, and retracting the blade into the centering device to pull the end cap from the tube. In an embodiment, the step of cleaning the outer surface of the first tube and the second tube is carried out via laser ablation. In an embodiment, the method may also include, after welding the first tube to the second tube, inspecting the butt weld for defects. If a defect is detected, a first conveyor is reversed to move the first tube and the second tube to a repair station, the butt weld is cut at the repair station, new weld preparations are machined on the first tube and the second tube, a second conveyor is reversed to move the first tube and the second tube back to a welding station and, at the welding station, the first tube is butt welded to the second tube.

In another embodiment, an autonomous apparatus for the manufacture of long boiler tubes is provided. The apparatus includes a decapping station configured to remove end caps from ends of a first tube and a second tube, a cleaning station configured to remove a contaminant surface layer from an outer surface of the first tube and the second tube, a weld preparation station configured to form a weld preparation in at least an upstream end of the first tube and a downstream end of the second tube, a joining station configured to butt weld the first tube to the second tube, and at least one control unit configured to control operation of the decapping station, cleaning station, weld preparation station and joining station without intervention by a human operator after the first tube and second tube are received at the decapping station, and to control material flow of the first tube and the second tube from the decapping station to the joining station. In an embodiment, the apparatus also includes an inspection and verification station configured to measure a plurality of properties of the first tube and the second tube and to compare the measured property values to target property values stored in memory, wherein the plurality of parameters include at least a chemistry, wall thickness and hardness. In an embodiment, the apparatus also includes an identification station controlled by the control unit, the identification station being configured to print identifying information on the outer surface of the first tube and the second tube. In an embodiment the apparatus also includes a cutting station controlled by the control unit the cutting station being configured to retrieve a tube length specification stored in memory and to cut at least one of the first tube and the second tube according to the tube length specification. In an embodiment, the apparatus may also include a weld testing station configured to verify whether the weld produced at the welding station meets predetermined quality standards, wherein the control unit is configured to control operation of the weld testing station and movement of the first tube and the second tube to and from the weld testing station. In an embodiment, the apparatus also includes a repair station intermediate the weld testing station and the joining station and controlled by the control unit, the repair station having a saw for cutting through the butt weld and a rotating table having a machining device for machining a weld preparation on upstream and downstream ends of at least one of the first tube and the second tube. The control unit is configured to control flow of at least the first tube from the weld testing station, to the repair station, and to the joining station to repair a weld that has been determined to be defective by the weld testing station.

In yet another embodiment, an autonomous system for the manufacture of long boiler tubes is provided. The system includes a decapping device configured to remove end caps from ends of a first tube and a second tube, a cleaning device in line with the decapping device and being configured to remove a contaminant surface layer from an outer surface of the first tube and the second tube via laser ablation, a weld preparation device configured to machine a weld preparation in at least an upstream end of the first tube and a downstream end of the second tube after the contaminant surface layer is removed, a joining device configured to weld the first tube to the second tube, and at least one control unit configured to automatically control operation of the decapping device, cleaning device, weld preparation device and joining device, and to control material flow of the first tube and the second tube from the decapping device to the joining device to produce a long boiler tube. In an embodiment, the system may include a weld inspection device configured to inspect a weld between the first tube and the second tube, the weld inspection device including a digital, in-line x-ray system with automated defect recognition.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method for manufacturing boiler tubes, comprising the steps of:

removing end caps from a plurality of tubes, the plurality of tubes including at least a first tube and a second tube;

cleaning an outer surface of the first tube and the second tube;

forming a weld preparation on an upstream end of the first tube;

forming a weld preparation on a downstream end of the second tube;

welding the upstream end of the first tube to the downstream end of the second tube to form a butt weld, to produce a long tube;

with an automated device, measuring a parameter of at least the first tube and the second tube, the parameter includes at least one of tube dimensions, wall thickness, hardness and chemistry;

wherein the steps of removing the end caps, cleaning the outer surface of the tubes, forming the weld preparations, welding the first tube to the second tube and measuring the at least one parameter are performed autonomously and without storing offline between the steps;

comparing the measured value for the parameter of the first tube to a required value for the parameter stored in memory;

offloading the first tube if the measured value for the parameter does not match the required value;

with an automated printing system, receiving values for the measured parameters of the first tube aid the second tube; and printing identifying information on the outer surface of the first tube and the second tube, the identifying information including at least a value for at least one of the measured parameters.

2. The method according to claim 1, further comprising the step of:
receiving, via a conveyor, the plurality of tubes for removal of the end caps.

3. The method according to claim 1, further comprising the step of: prior to forming the weld preparation on the first tube and the second tube, cutting at least one of the first tube and the second tube to a predetermined length.

4. The method according to claim 3, further comprising the step of:
after welding the first tube to the second tube, inspecting the butt weld for defects utilizing a digital, in-line x-ray system with automated defect recognition.

5. The method according to claim 4, wherein:
each of the steps is performed autonomously, as an inline part of a long tube manufacturing process, without intervention by a human operator.

6. The method according to claim 1, wherein:
the step of removing the end caps includes, for each end cap, bringing a centering device into engagement with the end cap, extending a bisected blade from the centering device such that the bisected blade pierces the end cap and opposed blade portions of the blade bias away from one another, and retracting the blade into the centering device to pull the end cap from the tube.

7. The method according to claim 1, wherein:
the step of cleaning the outer surface of the first tube and the second tube is carried out via laser ablation.

8. The method according to claim 1, further comprising the step of:
after welding the first tube to the second tube, inspecting the butt weld for defects; and
if a defect is detected, reversing a first conveyor to move the first tube and the second tube to a repair station, cutting through the butt weld at the repair station, machining new weld preparations on the first tube and the second tube, reversing a second conveyor to move the first tube and the second tube back to a welding station and, at the welding station, butt welding the first tube to the second tube.

9. A method for manufacturing boiler tubes, comprising the steps of:
removing end caps from a plurality of tubes, the plurality of tubes including at least a first tube and a second tube;
cleaning an outer surface of the first tube and the second tube;
forming a weld preparation on an upstream end of the first tube;
forming a weld preparation on a downstream end of the second tube;
welding the upstream end of the first tube to the downstream end of the second tube to form a butt weld, to produce a long tube;
after welding the first tube to the second tube, inspecting the butt weld for defects;
if a defect is detected, reversing a first conveyor to move the first tube and the second tube to a repair station, cutting through the butt weld at the repair station, machining new weld preparations on the first tube and the second tube, reversing a second conveyor to move the first tube and the second tube back to a welding station and, at the welding station, butt welding the first tube to the second tube; and with an automated device, measuring a parameter of at least the first tube and the second tube;
wherein the steps of removing the end caps, cleaning the outer surface of the tubes, forming the weld preparations, welding the first tube to the second tube and measuring the at least one parameter are performed autonomously and without storing offline between the steps.

10. The method according to claim 9, wherein:
the parameter includes at least one of tube dimensions, wall thickness, hardness and chemistry.

11. The method according to claim 10, further comprising the steps of:
comparing the measured value for the parameter of the first tube to a required value for the parameter stored in memory; and
offloading the first tube if the measured value for the parameter does not match the required value.

12. The method according to claim 11, further comprising the step of:
with an automated printing system, receiving values for the measured parameters of the first tube aid the second tube; and
printing identifying information on the outer surface of the first tube and the second tube, the identifying information including at least a value for at least one of the measured parameters.

13. The method according to claim 12, further comprising the step of:
prior to forming the weld preparation on the first tube and the second tube, cutting at least one of the first tube and the second tube to a predetermined length.

14. The method according to claim 13, further comprising the step of:
after welding the first tube to the second tube, inspecting the butt weld for defects utilizing a digital, in-line x-ray system with automated defect recognition.

15. The method according to claim 14, wherein:
each of the steps is performed autonomously, as an inline part of a long tube manufacturing process, without intervention by a human operator.

16. The method according to claim 9, wherein:
the step of removing the end caps includes, for each end cap, bringing a centering device into engagement with the end cap, extending a bisected blade from the centering device such that the bisected blade pierces the end cap and opposed blade portions of the blade bias away from one another, and retracting the blade into the centering device to pull the end cap from the tube.

17. The method according to claim 9, wherein:
the step of cleaning the outer surface of the first tube and the second tube is carried out via laser ablation.

18. A method for manufacturing boiler tubes, comprising the steps of:
removing end caps from a plurality of tubes, the plurality of tubes including at least a first tube and a second tube, wherein removing the end caps includes, for each end cap, bringing a centering device into engagement with the end cap, extending a bisected blade from the centering device such that the bisected blade pierces the end cap and opposed blade portions of the blade bias away from one another, and retracting the blade into the centering device to pull the end cap from the tube;
cleaning an outer surface of the first tube and the second tube;
forming a weld preparation on an upstream end of the first tube;

forming a weld preparation on a downstream end of the second tube;

welding the upstream end of the first tube to the downstream end of the second tube to form a butt weld, to produce a long tube;

with an automated device, measuring a parameter of at least the first tube and the second tube;

wherein the steps of removing the end caps, cleaning the outer surface of the tubes, forming the weld preparations, welding the first tube to the second tube and measuring the at least one parameter are performed autonomously and without storing offline between the steps.

19. The method according to claim 18, further comprising the step of:

receiving, via a conveyor, the plurality of tubes for removal of the end caps.

20. The method according to claim 18, wherein:

the step of cleaning the outer surface of the first tube and the second tube is carried out via laser ablation.

\* \* \* \* \*